United States Patent [19]

Naseth et al.

[11] 3,833,443

[45] Sept. 3, 1974

[54] METHOD OF MAKING FLEXIBLE CONDUCTOR CABLE

[75] Inventors: Dwight D. Naseth, Saugus; Joseph A. Delgadillo, Granada Hills, both of Calif.

[73] Assignee: Fortin Laminating Corporation, San Fernando, Calif.

[22] Filed: Oct. 20, 1972

[21] Appl. No.: 299,462

[52] U.S. Cl. ...................... 156/55, 29/624, 156/289, 174/117 A

[51] Int. Cl. ........................................... H01b 13/08

[58] Field of Search ................. 156/55, 289, 52, 53; 174/117 R, 117 F, 117 FF, 117 A; 29/624

[56] References Cited

UNITED STATES PATENTS

| | | | |
|---|---|---|---|
| 850,166 | 4/1907 | Lanpphier | 317/260 |
| 2,791,624 | 5/1957 | Kigler | 174/117 F X |
| 3,235,289 | 2/1966 | Jones | 156/289 X |
| 3,264,403 | 8/1966 | Erdlt | 174/72 B |
| 3,271,214 | 9/1966 | Tabor | 174/117 A |
| 3,391,246 | 7/1968 | Freeman | 174/117 FF |
| 3,547,718 | 12/1970 | Gordon | 174/117 FT |

FOREIGN PATENTS OR APPLICATIONS

| | | | |
|---|---|---|---|
| 1,086,823 | 10/1967 | Great Britain | 174/117 FF |

*Primary Examiner*—E. A. Goldberg
*Attorney, Agent, or Firm*—Marvin H. Kleinberg

[57] ABSTRACT

End or intermediate interruption of one or both sides of insulation is effected by selective application of release agent to the area of the conductor to be interrupted before lamination of the conductor between sheets of insulation. Multiple conductor cable is provided by winding conductor from a single supply in a controlled pitch onto a revolving flat mandrel containing sequential bands of release agent and adhesive coated insulation. The outside surfaces of the sheet are similarly covered with said bands to form an assembly which is laminated to provide a sequentially interrupted, flexible conductor cable. The system of the invention provides precision placement of insulation on the conductors, leaving exposed interrupted areas of the conductor in an absolutely clean and undamaged condition.

9 Claims, 7 Drawing Figures

PATENTED SEP 3 1974

3,833,443

SHEET 1 OF 2

METHOD OF MAKING FLEXIBLE CONDUCTOR CABLE

BACKGROUND OF THE INVENTION

1. Field of the Invention

The present invention relates to flexible, electrical connector cables and more particularly to controlled interruption of the insulation during fabrication of the cables.

2. Description of the Prior Art

Compact packaging and other specific application requirements have led to the use of flexible connect cable to inter connect rigid circuit boards, flexible circuits or other electronic components or assemblies. Prior flexible cables were manufactured by continuous roll-to-roll lamination techniques providing a completely insulated product.

This technique required one roll per conductor. For example, it would require 64 rolls to manufacture a connector containing 64 individual conductors. Since the conductor wire can be flat, round or braided and may be required in different metals or sizes, this provided a tremendous inventory problem and the initial start-up or change-over from one grade or size to another required tremendous handling and personnel time.

Furthermore, in order to utilize these products a length of cable was cut and the ends stripped of insulation by mechanical means. It is very difficult to strip the insulation from flat conductor wire and even with round conductor wire it is very difficult to strip the insulation from the ends without disturbing the surface of the conductor, flexing or bending the wire to a non-desired attitude and some resin tended to be left on the conductor which would interfere with soldering. Intermediate stripping was even more difficult and the chances of disturbing or breaking the conductor was even higher. Furthermore, bends can interfere with the flex life of the cable system.

SUMMARY OF THE INVENTION

End or intermediate interruption of one or both sides of the insulation covering of single or multiple conductor flexible cable is effected by selective application of release agent to the surface of the conductor wire at the desired location for the interruption before lamination of the conductor between opposed sheets of bondable insulation. In a preferred technique, conductor cable from a single supply is wound in a controlled pitch onto a revolving flat mandrel, the surface of which contains sequential bands of release agent and adhesive coated insulation in a direction perpendicular to said bands. After winding is complete, further plates containing said bands are applied to the outer surfaces of the wire to form a laminating assembly which is then cured.

During cure, the assembly is placed in a press under pressure and at a temperature at which the adhesive resin becomes liquid. The liquid resin flows around the conductors to form a homogenous bond and a heat activated catalyst in the resin converts it to a thermoset condition which permanently holds the conductor in the final configuration. The bands of release material act as a dam which prevents flow of the resin onto the portions of wire covered by the release material, which portions remain free of insulation and adhesive and are ready for soldering and connection.

After cure, the ends of the wire at the edge of the flat mandrel are cut to form two lengths of flexible cable which can be further cut into shorter lengths at any of the interrupted areas which are absent insulation. The process of the invention is easily adapted to any size or type of cable requiring conductor exposure on one side, both sides or alternate sides of a dielectric simply by creating a laminating mold to meet the desired requirements.

The advantages are many. The problems related to contaminated or damaged conductors on attempting to strip the insulation mechanically or chemically are entirely eliminated. The cables are immediately ready for welding or soldering without the costly process of stripping the insulation and cleaning the conductors. Uniform electrical characteristics are maintained, costly wiring mistakes are eliminated. The system of the invention provides low cost, positive, mistake-free jumpering.

The flexible cables of the invention will find use in commercial, computer, industrial and military applications. The sequentially intermediate interrupted flexible cables of the invention will provide high flex life, weight and space savings, precision conductive pitch control and uniform electrical characteristics. The insulation and compatible adhesive system can withstand many cycles of flexing without failure and are capable of withstanding solder pot immersion for solder tinning or re-flow soldering operations.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figures 1, 2, 3, 4, 5, 6:
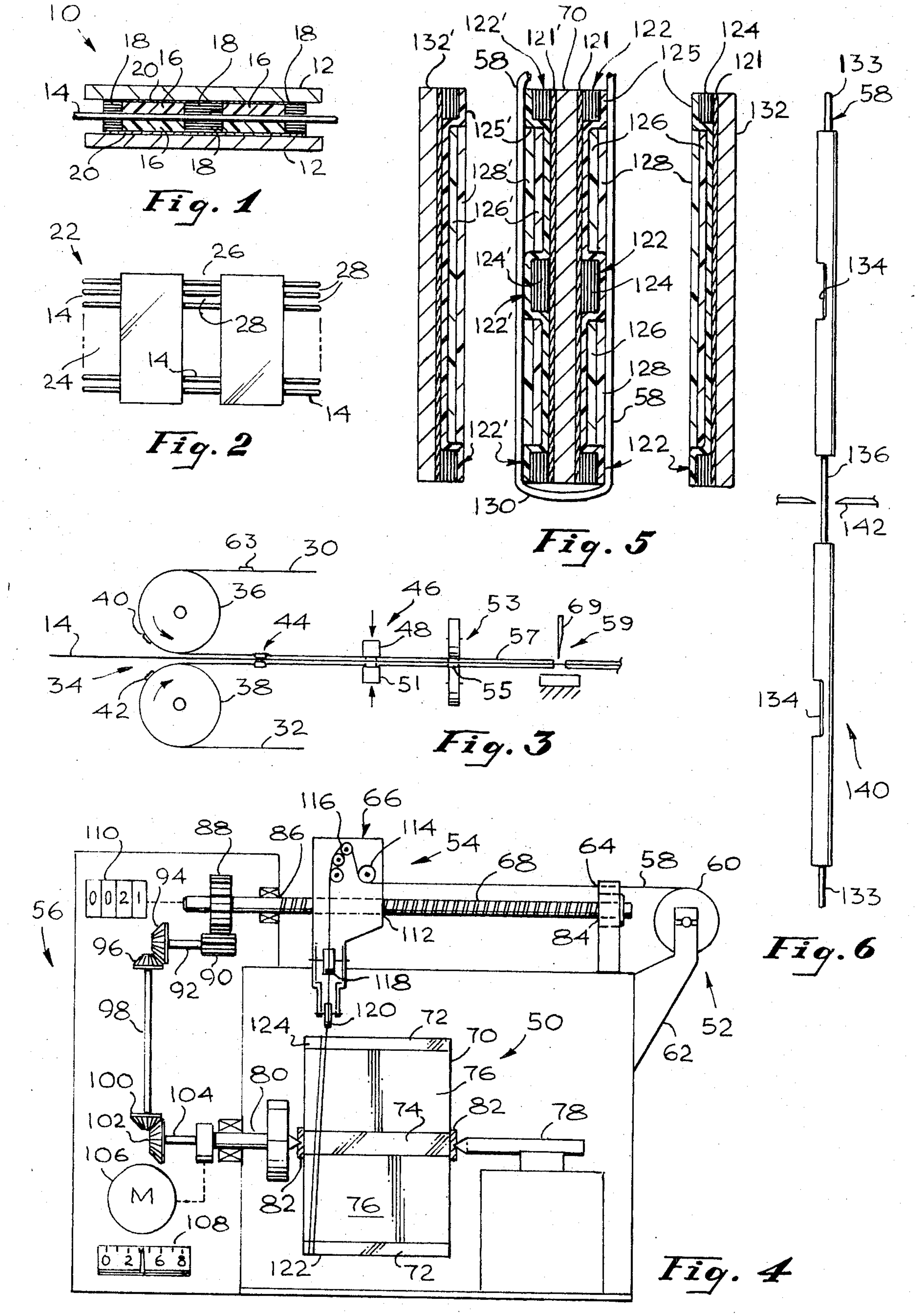
FIG. 1 is a schematic view of a laminating lay-up for forming an interrupted flexible cable in accordance with the invention.
FIG. 2 is a front elevational view of an interrupted flexible cable of the invention.
FIG. 3 is a schematic view of a continuous process for forming a flexible cable in accordance with the invention.
FIG. 4 is a schematic view of an apparatus for forming multiple flexible cable from a single supply.
FIG. 5 is a sectional view of the laminating lay-up of the flat mandrel of the apparatus of FIG. 4.
FIG. 6 is an end elevational view of the flexible cable produced in the apparatus of FIG. 5

In its broadest aspects, the present invention provides for selective interruption of one or both sides of the insulation covering of flexible electrical conductor cable during application of the insulation to the conductor cable. Absence of insulation at the location of the interruption is facilitated by isolating the intended interrupted area from the insulation during lamination. In a preferred form of the invention, bands of release agent corresponding in width to the size of the interruption are applied across the surface of the cable at the desired location, preferably in intimate contact therewith. The bands of release agent may alternate sequentially with discontinuous bands of laminatible insulation or bands of release agent may be applied to the conductor and covered with continuous bands of insulation to facilitate later selective removal of the insulation to form interruptions. The release agent may be a solid or liquid material as long as it is compatible with the insulation and capable of functioning under the temperature and pressure conditions experienced during lamination.

The process of the invention may be practiced by static techniques, dynamic techniques which may be a batch, semi-continuous or continuous in nature.

Although the system of this invention is of general application to the provision of interruptions on conductor cables during lamination, it is of particular usefulness in the fabrication of flexible, multiple conductor cables, such as those used as jumpers between circuit boards. The conductors are typically formed of copper or alloys thereof and may be of flat, circular or braided configuration. Exemplary conductors providing excellent flexibility have AWG numbers between about 24 and 32. Corresponding dimensions for flat conductors would be a thickness between about 2 and 5 mils and a width from about 25 to about 64 mils.

The spacing between conductors can be varied at will and can be uniform or non-uniform. Usual spacing will be between 25 and 1000 mils. The width of the cable is determined by the number of conductors, diameter of the conductors and the spacing. The cable will usually contain at least 1 and no more than 75 conductors. The length of the cable is also dependent on the design requirements for the system. The length of the cable can be fairly large in the roll-to-roll or batch methods. In the card-winding technique, the length of the cable is limited to twice the length of the card.

The insulating cover for the conductor cable is formed of an organic resin exhibiting high dielectric strength and good flexural strength. The insulating cover should be capable of withstanding solder pot temperature without substantial flow. For these reasons, cured thermoset resins such as polyimides perform better than thermoplastic resins. Good flexibility is maintained by the use of sheets of resin having a thickness between about 1 and 10 mils. The sheets of cured thermoset resin require an adhesive to bind the sheets of insulator to each other and to bond the conductors and maintain them in parallel position. The adhesive resin is typically a B-stage thermosetting epoxy resin containing a latent, heat-activated catalyst. For example, a B-stage epoxy resin will flow to form a liquid as the temperature is raised to curing temperature. The liquid resin flows around and completely wets the conductor wires. As heat and pressure is continued, the catalyst advances the cure of the adhesive resin to a fully cured condition firmly bonding the sheets of insulation and permanently holding the conductors in their final configuration.

The release material is compatible with the conductor, adhesive and insulator resin and is capable of functioning at the curing temperature of the adhesive. The release material does not form a bond with the conductor, the adhesive or the insulator under the laminating conditions to be practiced. Since liquid release agents such as liquid fluorocarbon resins are more difficult to localize, the release material is preferably a sheet or flexible film of a compatible resin such as fluorinated resin, suitably Tedlar (polyvinyl fluoride) or Teflon (polytetrafluoroethylene) or a silicone resin such as a dimethyl polysiloxane.

Material lay-up during lamination is very critical and determines the success of the finished product. Wire spacing is easily disturbed by the lamination cycle which requires high pressure and elevated temperature. The continuous tight helix formed in the preferred winding technique of the invention contributes to maintaining correct wire position. Formation of a mold around the conductor and insulator during lamination further aids in holding the conductors and insulators in their proper attitudes. This is accomplished by lining the rigid pressure plates of the laminating assembly with a pair of resilient forming pads, suitably a thick sheet of Kraft paper having a thickness from about 10 to about 50 mils. When pressure and heat are applied to the rigid conductors, the forming pads will be compressed and conform the insulator to the shape of the conductors and press the excess forming pad into the space between the conductors to assure a good bond between the conductors. The pressure of the conductors will also place the opposed sheets of release material in intimate contact forming a seal which prevents flow of adhesive resin or insulator into the interruption. The flow of adhesive into the interruption is also prevented by forming a raised backing member which acts as a dam to increase the pressure on the conductors and thereby prevent flow of liquid adhesive or insulator resin into the interrupted area.

Referring now to FIGS. 1 and 2, a static batch method for forming sequentially interrupted flexible cables is disclosed. FIG. 1 illustrates the laminating assembly for forming the cable. The assembly 10 is formed of a pair of rigid press plates 12 enclosing the conductor wires 14 of the discontinuous sheets of insulating dielectric 16 and strips of compatible release material 18. The assembly is formed by laying the strips of release material 18 and insulation 16 onto the bottom plate 12. The release material 18 may contain an inner layer of adhesive 20 to bind the release material to the plate 12 and to secure the insulation 16 in place. The conductors 14 are then laid in parallel spaced alignment on top of the insulation 16 and release material 18. The top plate 12 is then prepared containing corresponding strips of insulation 16 and release material 18. The assembly is then placed under pressure and heated to the melting or curing temperature of the insulation 16.

During cure, the opposed sheets of insulation 16 bond together to form a flexible cable assembly 22 as shown in FIG. 2. The end areas 24 containing the end strips of release material 20 and the intermediate area 26 containing the middle strip of release material 18 are free and clear of insulation and contain conductors 14 separated by spacings 28. After cure, the flexible conductor cable is cooled to room temperature. The plates 12 with the adherent release material 18 are separated exposing the formed flexible cable 22 having end interruptions 24 and an intermediate interruption 26 in the insulation, fully exposing the conductors 14.

FIG. 3 illustrates a continuous method for forming sequentially interrupted flexible cable in accordance with the invention. In the system of FIG. 3, a conductor wire 14 and a top sheet of insulation 30 and a bottom sheet of insulation 32 are all fed into the nip 34 formed between heated laminating rollers 36 and 38. When it is desired to form an interruption exposing both sides of the conductors, strips 40, 42 of release material are applied across the surface of sheets 30 and 32 at corresponding opposed points of their travel so that after lamination the sheets 30 and 32 seal the strips 40 and 42 into a raised protuberance 44. As the protuberance 44 passes by station 46, opposed cutting dies 48 and 51 are actuated to sever the insulation 30, 32 on each side thereof which is then peeled at station 53 to form an interruption 55. The continuous strip 57 of flexible cable is cut into lengths at station 59 by actuating cutting blade 69.

A cable which is interrupted and exposed at only one side is formed by applying a strip 63 of release material to only one of insulators 30 or 32. In this case, only die cutter 48 would be actuated to form a cut line in the insulation sheet 30 which is stripped to expose the conductors 14.

The systems described above both provide selective placement of insulation on the conductors leaving the exposed interrupted areas of the conductor on either or both sides of the cable and in a clean and undamaged condition ready for soldering and connection. However, as discussed above, multiple conductor cable products require a separate supply spool of conductor wire for each conductor desired in the end product and therefore the necessity to inventory numerous grades, sizes and lengths of conductor. These disadvantages are obviated in the system described in FIGS. 4 and 5.

This system generally comprises a rotatable rigid substrate containing sequential bands of laminatible insulator alternating with bands of release material and means for winding conductor onto the rigid substrate in a controlled pitch. Referring now to FIG. 4, the apparatus generally includes the rotatable substrate or mandrel assembly 50, a conductor supply and unwind assembly 52, a winding assembly 54 and rotation and control assembly 56.

The conductor 58 is fed from supply spool 60 positioned on the tensioned unwind 62 through guide 64 through the rider 66 positioned on rotating lead screw 68 and is wound in a controlled pitch onto the coated mandrel 70. The mandrel is preferably of planar configuration and may be circular, ovoid or flat. A flat planar rigid mandrel is preferred since the mandrel can then serve as an internal pressure plate during lamination and material lay-up is simplified as will be described in more detail with reference to FIGS. 5 and 6. The mandrel 70 contains on each side thereof end bands 72 of release material, optional band of intermediate release material 74 and sequential bands of insulation 76.

The mandrel 70 is supported between the adjustable arbor 78 and the rotating chuck 80 by means of clamps 82.

The apparatus is capable of infinitely changing the pitch of the conductor 58 by changing the relative rates of rotation of the lead screw 68 and the rotating mandrel 70. For example, if the machine is set up to wind a basic pitch of 0.025 centers when the rider 66 traverses the lead screw by one inch, the mandrel 70 is revolved 40 times.

The lead screw is rotatably supported between bearings 84 and 86 and is rotated by means of a driven gear 88 which engages driver gear 90. Driver gear 90 is directly connected to the rotating chuck 80 through shaft 92, bevel gears 94, 96, shaft 98, bevel gears 100, 102 and shaft 104. The chuck 80 is driven by motor 106 through an infinite variety of speeds from 0 to 50 rpm's by means of drive control 108.

The pitch is infinitely variable by changing the drive relationship between lead screw 68 and chuck 80 by changing the gear ratio between gears 88 and 90. To relieve constant attention by an operator, a preset counter 110 automatically shuts off the machine at a given number of revolutions of mandrel 70.

The rider 66 is threaded at 112 so as to advance toward the unwind on rotation of lead screw 68. The conductor is fed by guide roll 114 through a pulley train 116 having the capability of infinitely varying the gap setting. The conductor wire 58 is then fed through a final tensioning pulley 118 and a final guide pulley 120 before being attached to one edge 122 of the mandrel 70. As the mandrel 70 rotates, the wire will wind in a set gap providing an even spacing 124 between the conductor wires 58.

The apparatus is a modified coil winder; many types of similar instruments have been used for winding electrical solenoids, motor windings and precision instruments and can be adapted readily for use in the present invention. To initiate a run, a stainless steel plate 70 is cut to any size to best accommodate the given requirements and positioned on the apparatus between clamps 82. The arbor 78 is moved to accommodate the plate which may vary from 6 inches to 36 inches or more depending on the capabilities of the winding machine. The conductor unwind assembly 52 and pulleys 116, 118 and 120 are fully adjustable to transport any size round wire or flat ribbon providing the apparatus with unusual versatility.

The details of the material lay-up of the mandrel and press plate 70 are described in detail in FIG. 5. Only one side of the lay-up will be described, the other being indicated as a mirror image with the corresponding prime subscript numerals. A resilient forming pad 121 consisting of a 10 mil thick sheet of Kraft paper is then cut to size and placed on each side of mandrel plate 70. Dams 122 are then formed at locations and of lengths corresponding to the desired interruptions. Suitably the dams are formed by forming a secured protuberance by cutting a strip of double-backed adhesive tape 124 of the length of the desired interruption and securing it to the forming pad 121 at the desired location. As shown in FIG. 5, dams 122 are formed at each end and in the middle of the plate 70.

A sheet 125 of pliable release material such as 1 mil thick Teflon is then applied to the plate 70 by adhering it to the outer surface of the adhesive tape 124 at the location of the dams and pressing it below the surface of the adhesive tape onto the paper pad 121 at the locations between the dams 122. Strips 126 of thermoset polyimide insulating dielectric containing a layer 128 of heat-curable epoxy adhesive are then cut to the size corresponding to the length between the dams 122 and are pressed between the dams such that the sheet 125 of release material only appears on top of the dams 122.

The mandrel 70 is now ready for winding and is placed between clamps 82 of the apparatus and conductor 58 is wound thereon in a controlled even pitch onto both sides of the plate forming turns 130 as it traverses the plate from side to side. When the counter 110 turns off the machine, the clamps are released and outer pressure plates 132, suitably also formed of stainless steel, are laid up with similar layers of material. For purposes of illustration, outer plates 32 are formed such that the middle interruption is sealed on its outer surface. The lay-up will thus contain a 10 mil thick sheet 121 of Kraft paper as a forming pad and end strips 124 of double adhesive masking tape. The sheet 125 of Teflon is secured to the dam pads 122 and is recessed below the surface and is covered by a continuous strip of polyimide 126 coated with a film of epoxy adhesive 128.

Figure 7:
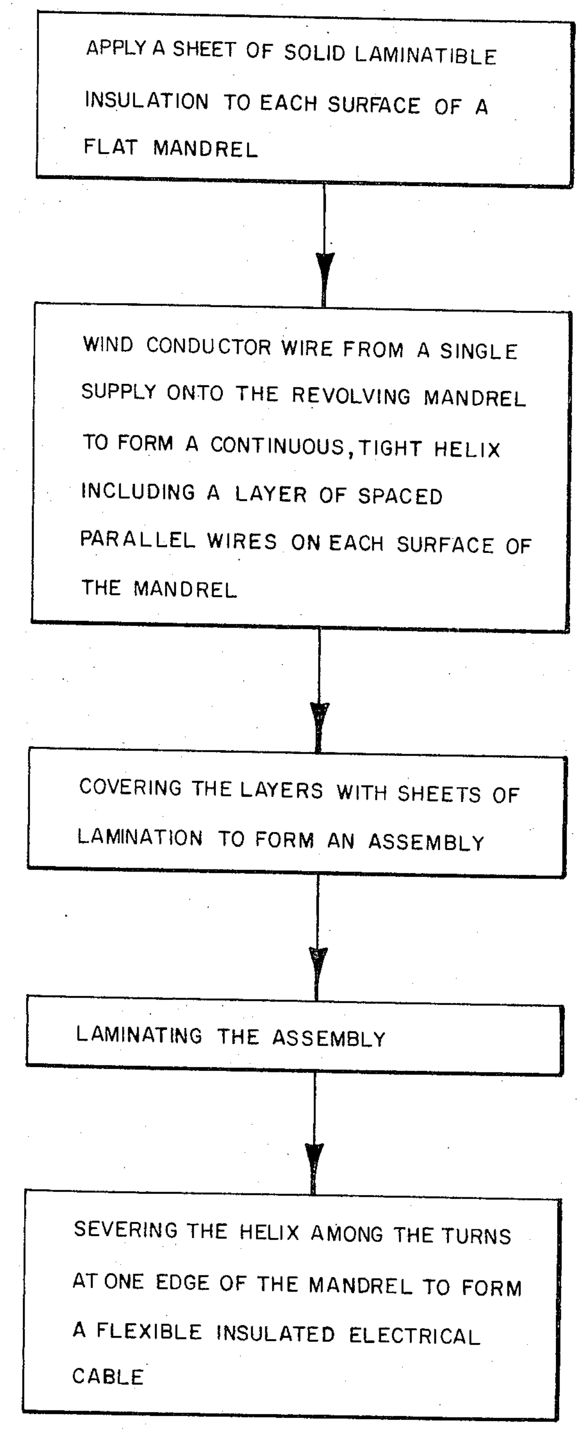
FIG. 7 is a block description of a technique of forming a flexible, insulated, electrical cable.

The laid-up outer plates 132, 132' are then applied to cap off the wound mandrel plate 70 to form a book ready for laminating. The book is placed in a press under pressure of about 100 to 500 psi and heated to a temperature of about 345°F for about 60 minutes to wet out and cure the resin. After lamination is completed, the outside plates 132 and 132' and the layers of Kraft paper 121, 121', adhesive masking tape 124, 124' and Teflon 125, 125' are then removed. The winding is cut on at least one end 130 and removed from the mandrel 70. The corresponding lay-up materials are removed to form an interrupted cable as shown in FIG. 6 in which the ends 133 are exposed and intermediate interruptions are provided which are exposed to one side at 134 and at both sides at 136. The cable 140 may be further severed by means of blades 142 at the interruption 136 to provide a pair of flexible conductor cables. The invention is also directed to the manufacture of flexible, insulated, electrical cables as depicted in FIG. 7.

It is to be understood that only preferred embodiments of the invention have been described and that numerous substitutions, alterations and modifications are all permissible without departing from the spirit and scope of the invention as defined in the following claims.

What is claimed is:

1. A method of forming a flexible, insulated, electrical cable having preselected interrupted portions comprising the steps of:

applying to each surface of a flat, revolvable mandrel discontinuous bands of solid, laminatible, electrical insulation and discontinuous bands of solid, release material at locations absent said insulation and corresponding to said interrupted portions;

revolving said mandrel and winding conductor wire from a single supply in a controlled pitch onto said mandrel to form a continuous, tight helix including a layer of spaced, parallel conductor wires on each surface of the mandrel;

covering said layers with sheets of laminatible insulation to form an assembly;

laminating the assembly to adhere the bands of insulation to the opposed sheets of insulation and to the conductor in the locations absent solid release material;

severing said helix along the turns at one edge of the mandrel to form a flexible, insulated, electrical cable; and stripping the bands of release material from the conductor to form interruptions exposing the surface of the conductor.

2. A method according to claim 1, in which the bands of insulation comprises a flexible film of dielectric containing a coating of heat-curable adhesive resin.

3. A method according to claim 2 in which the dielectric film comprises a cured, thermoset resin.

4. A method according to claim 3 in which the cured thermoset resin comprises a polyimide.

5. A method according to claim 4 in which the adhesive resin comprises a B-stage epoxy resin containing a heat-activated catalyst.

6. A method according to claim 1 in which the outer surfaces of the conductors on each side of the flat mandrel are covered with opposed bands of release material and insulation to form an assembly.

7. A method according to claim 1 in which the assembly is laminated between rigid pressure plates and at a temperature above the curing temperature of the adhesive resin.

8. A method of forming a flexible, insulated, electrical cable comprising the steps of:

applying to each surface of a flat, revolvable mandrel a sheet of solid, laminatible insulation;

revolving said mandrel and winding conductor wire from a single supply in a controlled pitch onto said mandrel to form a continuous, tight helix including a layer of spaced, parallel conductor wires on each surface of the mandrel;

covering said layers with sheets of laminatible insulation to form an assembly;

laminating said assembly; and severing said helix along the turns at one edge of the mandrel to form a flexible, insulated, electrical cable.

9. A method according to claim 8 in which the sheets of insulation comprise a flexible film of dielectric containing a coating of a heat-curable adhesive resin.

* * * * *